Patented May 24, 1938

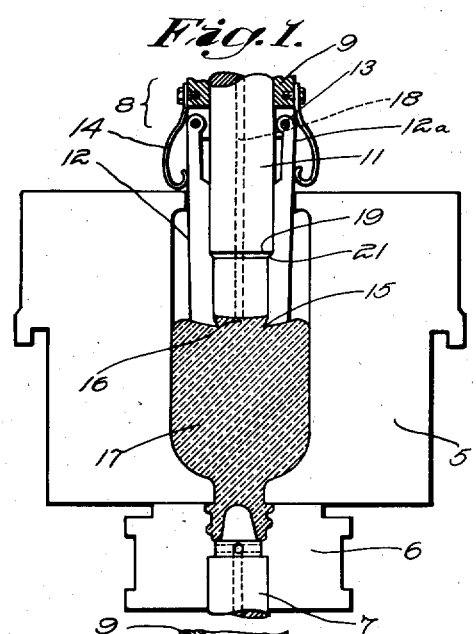
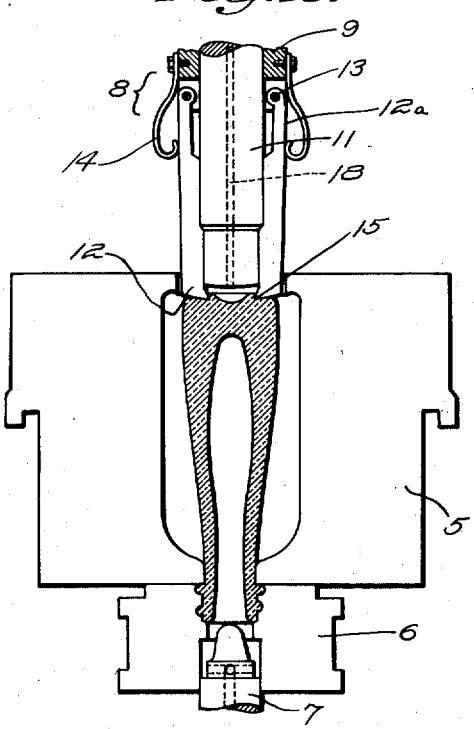
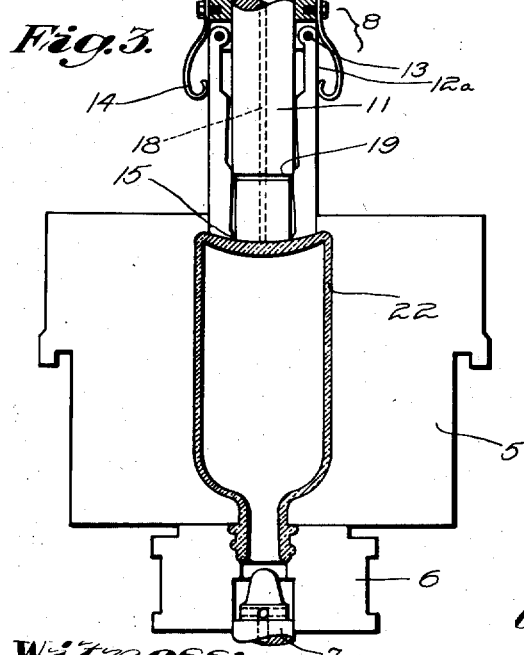
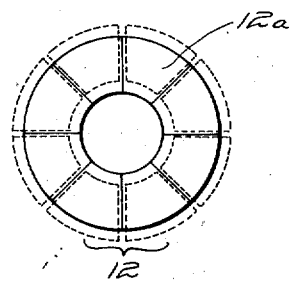

2,118,793

UNITED STATES PATENT OFFICE 2,118,793

BOTTOM CLOSURE OF GLASSWARE FORMING MOLD

George E. Howard, Butler, Pa., assignor to Hartford-Empire Company, Hartford, Conn., a corporation of Delaware Application November 10, 1936, Serial No. 110,108

7 Claims. (Cl. 49—76)

This invention relates to bottom closures for glassware forming molds and has particular relation to a closure for a finishing or blow mold adapted to become attached to the bottom of a blank of glass and to assist in the elongation of the blank to form a parison as well as to form the bottom of the finished article.

It has been proposed to employ such a plunger to form a blank in a finishing mold and neck mold, the plunger being attached to the blank after it has pressed the blank in the blank and neck molds and elevated as air is supplied to the neck mold to form a hollow elongated parison from the blank, and the plunger finally moving into position to close the bottom of the mold for the final blowing operation.

The general object of this invention is to provide a plunger of the above character of novel construction by the use of which secure attachment of the glass thereto is assured and other advantages obtained.

More specifically, an object of the invention is to provide a novel plunger which is adapted to provide a mechanical attachment of the glass thereto, by which a more secure hold on the glass is obtained than if suction alone should be relied upon for holding the glass by the plunger, the effective area upon which suction can be applied being relatively small.

Other objects and advantages of the invention will be pointed out in the description which follows, or will become apparent from such description and the accompanying drawing, in which—

Figures 1 to 3 inclusive are views in vertical sectional elevation of my novel plunger and a blow mold with which it is associated, and illustrating respectively various operative positions of the plunger in the formation of a hollow article, and Fig. 4 is a view in bottom plan of said plunger.

Referring in detail to the drawing, a finishing mold is shown at 5, a neck mold at 6 and a neck pin at 7. The plunger embodying the invention is indicated generally at 8.

The plunger 8 comprises an integral guide 9 for the upper portion of a core 11 and the lower portion of this core is surrounded by an expansible sleeve 12 formed of segmental members 12a pivoted for radial movement on guide 9, as shown at 13. The members 12a are yieldingly held against the core 11 by springs 14 and tend to hold the sleeve 12 contracted when core 11 is retracted therein, as shown in Fig. 1.

The bottom ends of members 12a are turned inwardly to provide a flange or reentrant end, as indicated at 15, and which, in conjunction with the bottom of the core, provide a recess or cavity adapted to form a dovetail 16 on blank 17 when pressed into the glass to compact it in the mold. This provides a mechanical connection of the glass with the plunger. The core 11 has a passage 18 therein for vacuum which acts on the top of the dovetail to provide additional connection to the plunger.

After a charge is delivered and the plunger moved downwardly into the mold 5 to press the blank 17 and form the neck finish, the mold 5 is cracked, neck pin 7 is lowered and the blank is developed into a hollow parison by the elevation of the plunger (by means not shown) and the admission of air through the neck ring. The neck pin may be lowered to reheat the interior of the neck finish and for the admission of air. Fig. 2 shows plunger 8 in its uppermost position after the formation of the parison, and at this time, the vacuum may be terminated and air admitted through passage 18 to separate the dovetail 16 from the bottom of the core 11 for reheating, as illustrated in Fig. 2. This application of air is so regulated as not to detach the glass from members 12a at this time, but may be sufficient to form a small cavity in the end of the blank.

To adapt the plunger for use as a bottom closure of the mold 5, core 11 is moved downwardly relative to members 12a by suitable means (not shown). Core 11 has a shoulder 19 which engages complementary shoulders on members 12a and when core 11 is moved downwardly, the members 12a are cammed apart, the ends thereof assuming the dotted-line positions of Fig. 4. The bottom end of the core has a similar action on the reentrant parts of members 12a. This expands sleeve 12, freeing the glass from the plunger which may now reheat and permits the end of the core to be brought flush with members 12a, as shown in Fig. 3, to form a bottom against which the parison may be blown into a finished article 22. The parts are so designed that the spaces between members 12 will not be wide enough to unduly mark the bottom of the finished article. When the blowing operation is completed, the parts of the plunger are restored to their original positions, as shown in Fig. 1.

Suitable means may be provided for opening and closing the molds, raising and lowering the neck pin and for operating the plunger and the parts thereof, and for controlling the supply of air for blowing the parisons. Such means have not been illustrated or described because they

Having thus described my invention, what I claim is:

1. A plunger for pressing and elongating a glass blank, the glass engaging end of which comprises a core and an expansible sleeve slidably receiving said core and so constructed and arranged that when the core is retracted in the sleeve and the sleeve is contracted a glass-receiving cavity is provided for attaching the plunger to the glass blank and when the core is projected outwardly of the sleeve and the sleeve is expanded the plunger is detached from the glass.

2. A plunger for pressing and elongating a glass blank, the glass contacting end of which comprises a core and an expansible sleeve slidably receiving said core, said sleeve comprising a plurality of segmental members shaped to form with the end of the core a glass-receiving cavity for the attachment of the plunger to said glass blank, and to release the glass when the sleeve is expanded.

3. A plunger for elongating a glass blank and for pressing and shaping the bottom of a finished article, the glass engaging end of which comprises a core, and an expansible sleeve slidably receiving said core and formed into a plurality of segments, said sleeve being shaped to provide a glass-receiving cavity for attaching the plunger to said blank when the core is retracted therein and the sleeve is contracted, and to release the glass and form with the core a bottom shaping surface when the sleeve is expanded and the core is projected outwardly thereof.

4. A plunger for pressing and elongating a glass blank, the glass engaging end of which comprises a core and an expansible sleeve forming with the core, when the core is retracted and the sleeve contracted, a glass-receiving cavity in the end of said plunger having a reentrant edge.

5. A plunger for pressing and elongating a glass blank, the glass engaging end of which comprises a core and an expansible sleeve forming with the core, a glass-receiving cavity in the end of said plunger, and said core having a passage therein for applying suction to said cavity.

6. A plunger for pressing and elongating a glass blank, the glass-engaging end of which comprises an expansible sleeve, and a core slidable in said sleeve so constructed and arranged that retraction of the core within the sleeve causes contraction of the sleeve and the formation of a cavity adapted to connect the plunger with the glass, and when the core is projected outwardly of the sleeve, the sleeve is expanded and the plunger is disconnected from the glass.

7. In combination with a body mold, neck mold and neck pin, a plunger adapted to be inserted through the bottom of the body mold to press a charge of glass in the mold and to elongate the glass, said plunger comprising an expansible sleeve and a core slidable therein, which core when retracted and said sleeve providing a cavity whereby said pressing operation connects the plunger with the glass, whereby the glass may be elongated by said plunger, and said core being adapted to disconnect the glass from the plunger when projected outwardly of said sleeve.

GEORGE E. HOWARD.

CERTIFICATE OF CORRECTION.

Patent No. 2,118,793.   May 24, 1938.

GEORGE E. HOWARD.

It is hereby certified that error appears in the printed specification of the above numbered patent requiring correction as follows: Page 2, first column, line 26, claim 3, strike out the words "pressing and" and insert the same after "for" in line 25, same claim; and that the said Letters Patent should be read with this correction therein that the same may conform to the record of the case in the Patent Office.

Signed and sealed this 19th day of July, A. D. 1938.

Henry Van Arsdale, (Seal)   Acting Commissioner of Patents.

can readily be supplied by one skilled in the art and illustration and description thereof are unnecessary for an understanding of the invention.

Having thus described my invention, what I claim is:

1. A plunger for pressing and elongating a glass blank, the glass engaging end of which comprises a core and an expansible sleeve slidably receiving said core and so constructed and arranged that when the core is retracted in the sleeve and the sleeve is contracted a glass-receiving cavity is provided for attaching the plunger to the glass blank and when the core is projected outwardly of the sleeve and the sleeve is expanded the plunger is detached from the glass.

2. A plunger for pressing and elongating a glass blank, the glass contacting end of which comprises a core and an expansible sleeve slidably receiving said core, said sleeve comprising a plurality of segmental members shaped to form with the end of the core a glass-receiving cavity for the attachment of the plunger to said glass blank, and to release the glass when the sleeve is expanded.

3. A plunger for elongating a glass blank and for pressing and shaping the bottom of a finished article, the glass engaging end of which comprises a core, and an expansible sleeve slidably receiving said core and formed into a plurality of segments, said sleeve being shaped to provide a glass-receiving cavity for attaching the plunger to said blank when the core is retracted therein and the sleeve is contracted, and to release the glass and form with the core a bottom shaping surface when the sleeve is expanded and the core is projected outwardly thereof.

4. A plunger for pressing and elongating a glass blank, the glass engaging end of which comprises a core and an expansible sleeve forming with the core, when the core is retracted and the sleeve contracted, a glass-receiving cavity in the end of said plunger having a reentrant edge.

5. A plunger for pressing and elongating a glass blank, the glass engaging end of which comprises a core and an expansible sleeve forming with the core, a glass-receiving cavity in the end of said plunger, and said core having a passage therein for applying suction to said cavity.

6. A plunger for pressing and elongating a glass blank, the glass-engaging end of which comprises an expansible sleeve, and a core slidable in said sleeve so constructed and arranged that retraction of the core within the sleeve causes contraction of the sleeve and the formation of a cavity adapted to connect the plunger with the glass, and when the core is projected outwardly of the sleeve, the sleeve is expanded and the plunger is disconnected from the glass.

7. In combination with a body mold, neck mold and neck pin, a plunger adapted to be inserted through the bottom of the body mold to press a charge of glass in the mold and to elongate the glass, said plunger comprising an expansible sleeve and a core slidable therein, which core when retracted and said sleeve providing a cavity whereby said pressing operation connects the plunger with the glass, whereby the glass may be elongated by said plunger, and said core being adapted to disconnect the glass from the plunger when projected outwardly of said sleeve.

GEORGE E. HOWARD.

CERTIFICATE OF CORRECTION.

Patent No. 2,118,793.  May 24, 1938.

GEORGE E. HOWARD.

It is hereby certified that error appears in the printed specification of the above numbered patent requiring correction as follows: Page 2, first column, line 26, claim 3, strike out the words "pressing and" and insert the same after "for" in line 25, same claim; and that the said Letters Patent should be read with this correction therein that the same may conform to the record of the case in the Patent Office.

Signed and sealed this 19th day of July, A. D. 1938.

Henry Van Arsdale, (Seal) Acting Commissioner of Patents.

CERTIFICATE OF CORRECTION.

Patent No. 2,118,793.   May 24, 1938.

GEORGE E. HOWARD.

It is hereby certified that error appears in the printed specification of the above numbered patent requiring correction as follows: Page 2, first column, line 26, claim 3, strike out the words "pressing and" and insert the same after "for" in line 25, same claim; and that the said Letters Patent should be read with this correction therein that the same may conform to the record of the case in the Patent Office.

Signed and sealed this 19th day of July, A. D. 1938.

(Seal)

Henry Van Arsdale,
Acting Commissioner of Patents.